United States Patent
Chen et al.

(10) Patent No.: US 12,450,860 B2
(45) Date of Patent: Oct. 21, 2025

(54) VIDEO PROCESSING METHOD AND ASSOCIATED SYSTEM ON CHIP

(71) Applicant: Realtek Semiconductor Corp., HsinChu (TW)

(72) Inventors: Ching-Lung Chen, HsinChu (TW); Chia-Chun Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 617 days.

(21) Appl. No.: 17/890,227

(22) Filed: Aug. 17, 2022

(65) Prior Publication Data

US 2023/0237621 A1    Jul. 27, 2023

(30) Foreign Application Priority Data

Jan. 27, 2022   (TW) ................... 111103610

(51) Int. Cl.
*G06V 10/25* (2022.01)
*G06T 3/4053* (2024.01)
*G06T 7/70* (2017.01)
*G06V 40/16* (2022.01)

(52) U.S. Cl.
CPC ............ *G06V 10/25* (2022.01); *G06T 3/4053* (2013.01); *G06T 7/70* (2017.01); *G06V 40/161* (2022.01)

(58) Field of Classification Search
CPC .......... G06T 5/00; G06T 3/4053; G06T 7/70; G06V 10/25; G06V 40/161
See application file for complete search history.

(56) References Cited

U.S. PATENT DOCUMENTS

| | | | |
|---|---|---|---|
| 11,297,286 B1* | 4/2022 | Bikumandla | H04N 5/265 |
| 11,638,103 B2* | 4/2023 | Rosenwein | H04R 25/606 |
| | | | 381/313 |
| 2012/0017232 A1* | 1/2012 | Hoffberg | F24F 11/30 |
| | | | 725/9 |
| 2019/0026864 A1* | 1/2019 | Chen | G06T 3/4053 |
| 2020/0334898 A1* | 10/2020 | Bae | G06T 17/00 |
| 2021/0192231 A1* | 6/2021 | Lee | G05D 1/0231 |
| 2022/0036524 A1* | 2/2022 | Deng | G06T 5/92 |
| 2022/0180767 A1* | 6/2022 | Aharonson | G10G 3/04 |
| 2024/0064431 A1* | 2/2024 | Ozone | H04N 25/533 |

FOREIGN PATENT DOCUMENTS

| | | |
|---|---|---|
| TW | 200823772 | 6/2008 |
| TW | 200915240 | 4/2009 |

* cited by examiner

*Primary Examiner* — Qun Shen
(74) *Attorney, Agent, or Firm* — Winston Hsu (57) ABSTRACT

The present invention provides a SoC including a recognition circuit and a processing circuit. The recognition circuit is configured to obtain image data from an image capturing device, and perform a recognition operation on the image data to generate a recognition result. The processing circuit is coupled to the recognition circuit, and is configured to determine a ROI in the image data according to the recognition result, perform image enhancement operation on the ROI to generate an enhanced region, and combine the enhanced region with the image data to generate processed image data.

8 Claims, 6 Drawing Sheets

VIDEO PROCESSING METHOD AND ASSOCIATED SYSTEM ON CHIP

BACKGROUND OF THE INVENTION

1. Field of the Invention

The present invention relates to a video processing method for live streaming.

2. Description of the Prior Art

Live streaming is widely used in society, for example, it can be used in remote video conferences. However, since the remote video conference may use lower-level cameras and codec circuits, and a network transmission speed may also be insufficient, the captured image may be unclear, which may cause trouble to the user.

SUMMARY OF THE INVENTION

It is therefore an objective of the present invention to provide an image display method, which can analyze captured image data to obtain a region of interest (ROI), and the ROI is image-enhanced and then combined with original image data for display, to solve the above-mentioned problems.

According to one embodiment of the present invention, a system on chip (SoC) comprising a recognition circuit and a processing circuit is disclosed. The recognition circuit is configured to obtain image data from an image capturing device, and perform a recognition operation on the image data to generate a recognition result. The processing circuit is coupled to the recognition circuit, and is configured to determine a ROI in the image data according to the recognition result, perform image enhancement operation on the ROI to generate an enhanced region, and combine the enhanced region with the image data to generate processed image data.

According to one embodiment of the present invention, a video processing method comprises the steps of: obtaining image data from an image capturing device, and performing a recognition operation on the image data to generate a recognition result; determining a ROI in the image data according to the recognition result; performing image enhancement operation on the ROI to generate an enhanced region; and combining the enhanced region with the image data to generate processed image data.

According to one embodiment of the present invention, a SoC positioned in an electronic device is disclosed, wherein the SoC comprises a recognition circuit and a processing circuit. The recognition circuit is configured to obtain image data from an image capturing device, and perform a recognition operation on the image data to generate a recognition result. The processing circuit is coupled to the recognition circuit, and is configured to determine whether an operating state of the electronic device or characteristics of the image data meet a condition. If the condition is met, the processing circuit determines a ROI in the image data according to the recognition result, performs image enhancement operation on the ROI to generate an enhanced region, and combines the enhanced region with the image data to generate processed image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
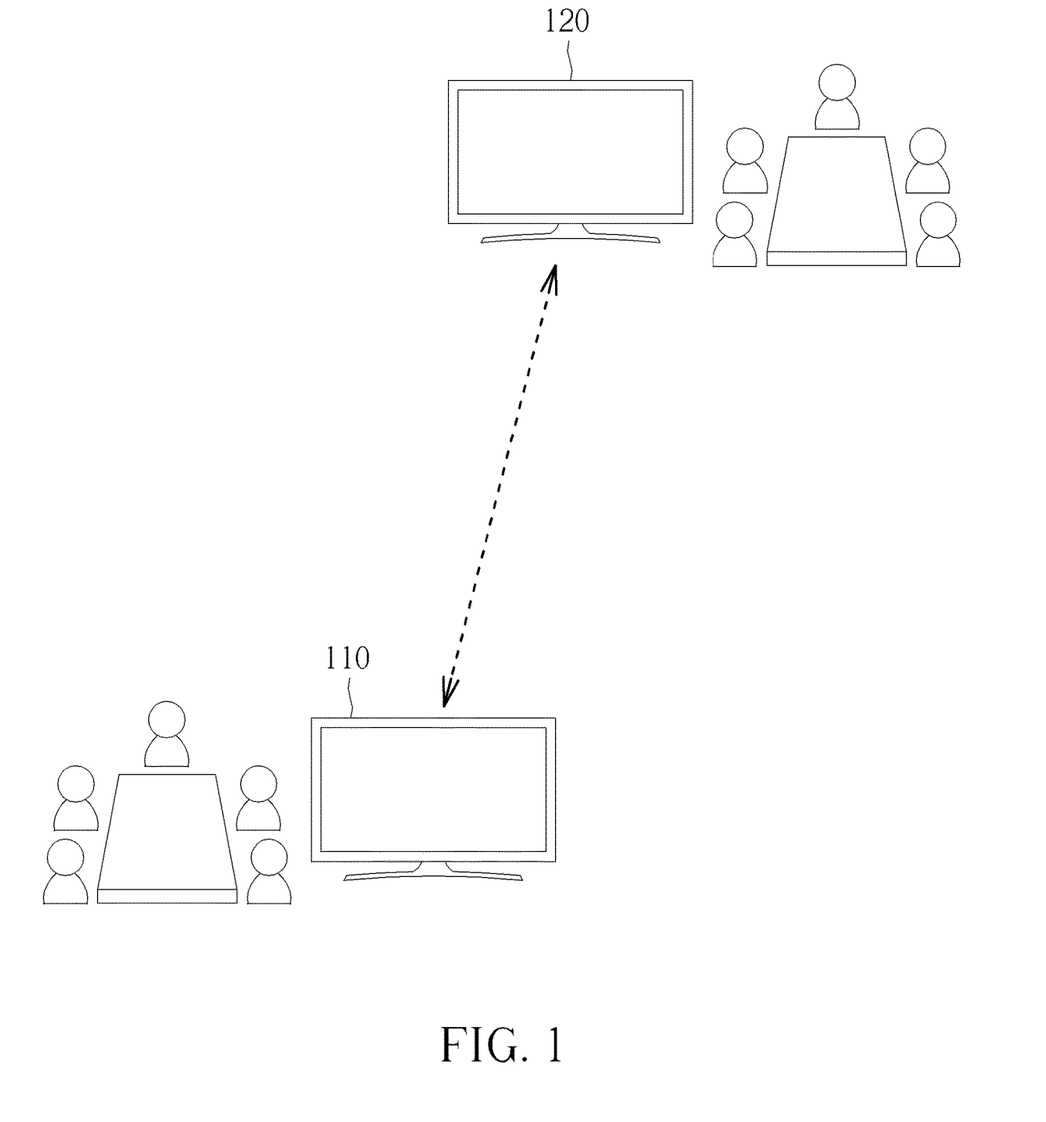
FIG. 1 is a diagram of a remote video conference.

FIG. 1 is a diagram of a remote video conference. As shown in FIG. 1, there is an electronic device 110 in a first conference room for capturing images and recording the sound in the first conference room in real time, and the captured images and the recorded sounds are transmitted to a second conference room through the network, for an electronic device 120 in the second conference room to display the images and play the sound of the first conference room. Similarly, the electronic device 120 in the second conference room captures images and records the sound in the second conference room in real time, and the captured images and the recorded sounds are transmitted to the first conference room through the network, for the electronic device 110 in the first conference room to display the images and play the sound of the second conference room. In this embodiment, the electronic device 110 and the electronic device 120 can be any electronic device with image and audio transceiver functions and network communication functions, such as televisions, notebook, tablet, mobile phones, etc.

As described in the prior art, the image frame transmitted by the electronic device 110 or the electronic device 120 may have poor quality due to the camera, the codec circuit or the network transmission speed, thus causing trouble for both parties. For example, when one party in the remote video conference includes multiple participants in the video, if the image quality is poor, it may sometimes be difficult for the other party's participants to know who is speaking in the video. Therefore, a system on chip (SoC) in the electronic device 110 of this embodiment provides a method that can enhance a region of interest (ROI) in the image, for example, to highlight the person speaking in the image, so that the participant in the second conference room can clearly know which participant is speaking in the first conference room, to solve the above problems.

Figure 2:
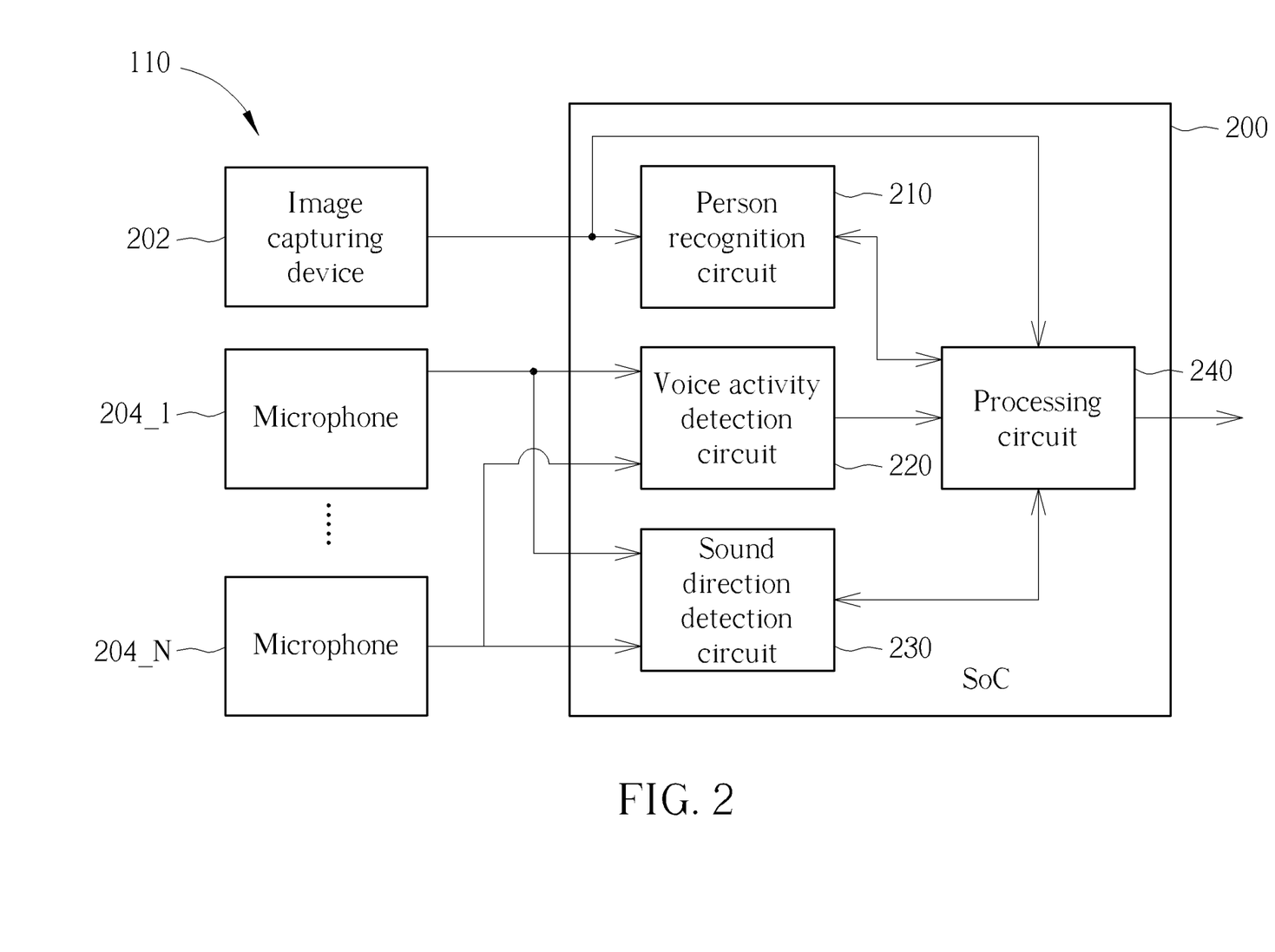
FIG. 2 is an electronic device according to one embodiment of the present invention.

FIG. 2 is an electronic device 110 according to one embodiment of the present invention. As shown in FIG. 2, the electronic device 110 comprises a SoC 200, an image capturing device 202 and a plurality of microphones 204_1-204_N, wherein N is any suitable positive integer greater than one. In addition, the SoC 200 includes a recognition circuit (in this embodiment, a person recognition circuit 210 serve as the recognition circuit), a voice activity detection circuit 220, a sound detection circuit (in this embodiment, a sound direction detection circuit 230 is used as an example), and a processing circuit 240. In this embodiment, the image capturing device 202 can be a camera or a video camera to continuously capture images in the first conference room in real time to generate image data to the SoC 200, wherein the image data received by the SoC 200 may be raw data or image data that has been processed. The microphones 204_1-204_N may be digital microphones, which are disposed at different positions of the electronic device 110 to respectively generate a plurality of sound signals to the SoC 200. It is noted that, in the embodiment of FIG. 2, the image capturing device 202 and the microphones 204_1-204_N are positioned within the electronic device 110. In other embodiments, however, the image capturing device 202 and the microphones 204_1-204_N can be externally connected to the electronic device 110.

In the SoC 200, the person recognition circuit 210 is used to identify person in the image data received from the image capturing device 202, to determine whether there is a person in the received image data, and to determine the characteristic value of each person and the position/region of each person in the image. Specifically, the person recognition circuit 210 can use a deep learning or neural network module to process each frame in the image data, such as using multiple different convolution filters to perform convolution operations on the frame (image frame) to identify whether there is a person in the frame. In addition, for the detected persons, a characteristic value of each person (or, a characteristic value of the region where each person is located) is determined by a previously used deep learning or neural network module, where the characteristic value can be represented as a multidimensional vector, such as a vector with dimension '512'. It is noted that the above-mentioned circuit design related to person recognition is well known to a person skilled in the art, and one of the main features of this embodiment is the applications of the person identified by the person recognition circuit 210 and the characteristic value thereof, so other details of the person recognition circuit 210 are not described here.

The voice activity detection circuit 220 is used to receive the sound signals from the microphones 204_1-204_N, and to determine whether there are voice components in the sound signals. Specifically, the voice activity detection circuit 220 can mainly perform the following operations: perform noise reduction operation on the received sound signal, convert the sound signal into a frequency domain, and process blocks to obtain characteristic values; and the characteristic value of is compared with a reference value to determine whether the sound signal is a voice signal. It is noted that since the related circuit design of the voice activity detection circuit 220 is well known to a person skilled in the art, and one of the main features of this embodiment is to perform the follow-up operations according to the determination result of the voice activity detection circuit 220, so other details of the voice activity detection circuit 220 will not be described here. In another embodiment, the voice activity detection circuit 220 can only receive the sound signals from some of the microphones 204_1-204_N, and does not need to receive the sound signals from all the microphones 204_1-204_N.

Regarding the operation of the sound direction detection circuit 230, since the positions of the microphones 204_1-204_N on the electronic device 110 are known, the sound direction detection circuit 230 can determine an azimuth of the main sound in the first conference room according to a time difference of the sound signals from the microphones 204_1-204_N (that is, phase differences between the received sound signals). That is, the sound direction detection circuit 230 determines direction and angle of the main speaker relative to the electronic device 110. In this embodiment, the sound direction detection circuit 230 can only determine one direction, that is, if there are multiple people talking at the same time in the first conference room, it will be determined from which direction the main sound comes from according to some characteristics (e.g., signal strength) of the multiple received sound signals. It is noted that since the related circuit design of the sound direction detection circuit 230 is well known to a person skilled in the art, and one of the main features of this embodiment is to perform the follow-up operations according to the detection result of the sound direction detection circuit 230, so other details of the sound direction detection circuit 230 will not be described here.

Figure 3:
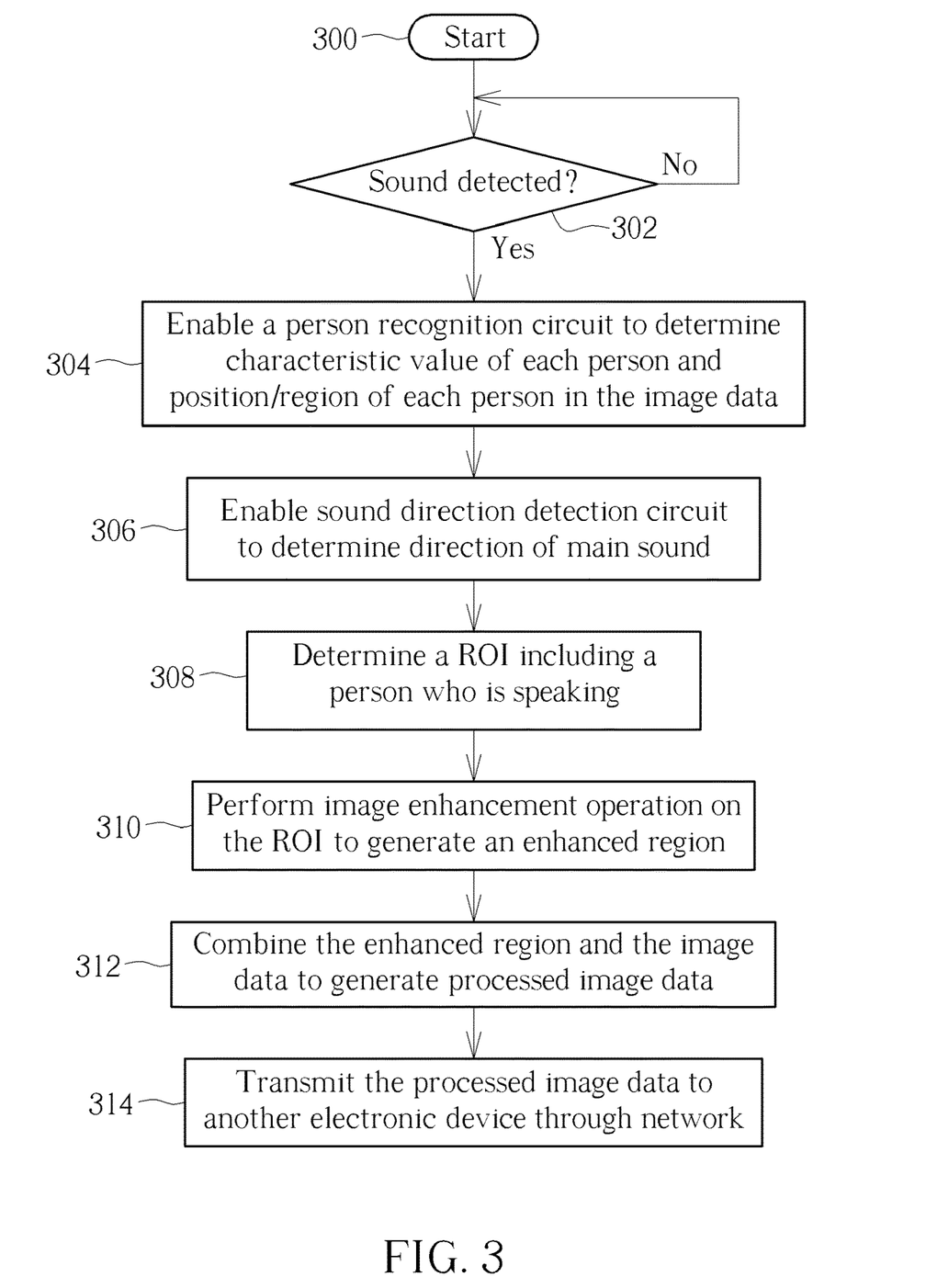
FIG. 3 is a flowchart of a video processing method according to one embodiment of the present invention.
Figure 4:
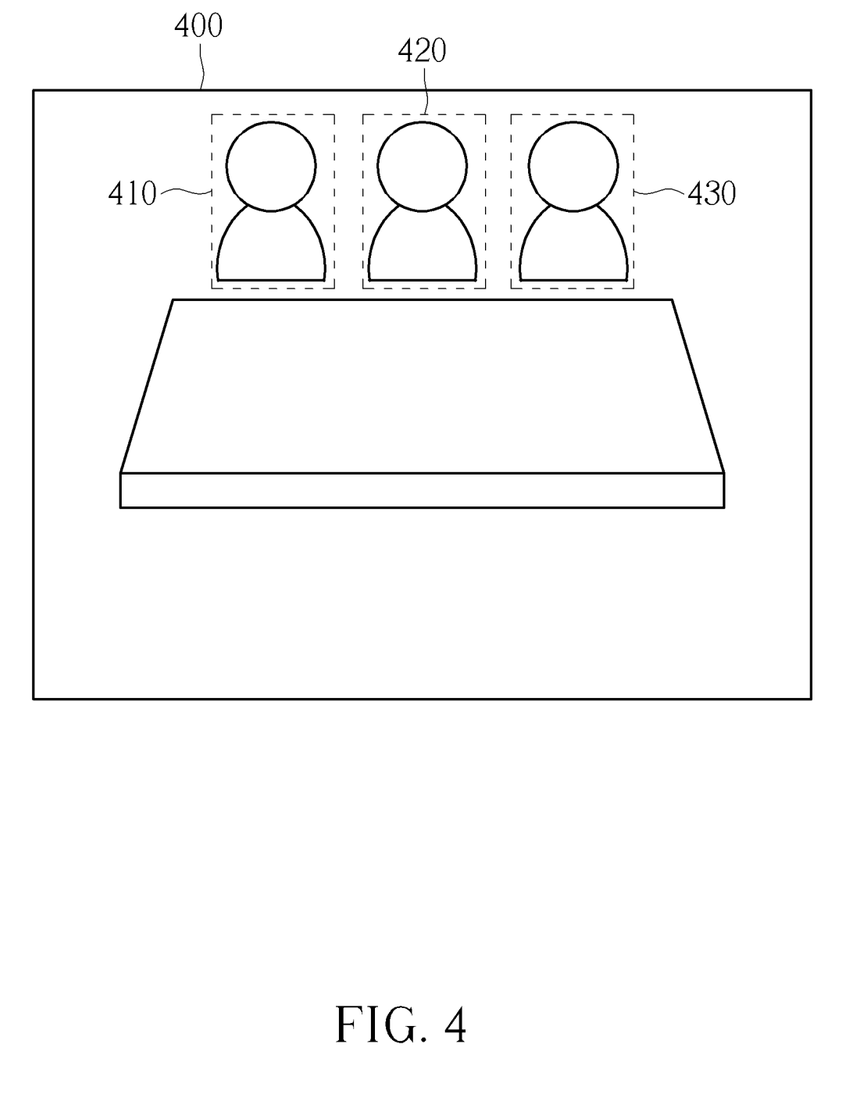
FIG. 4 is a schematic diagram of a plurality of persons in the image recognized by the person recognition circuit.

FIG. 3 is a flowchart of a video processing method according to one embodiment of the present invention. In Step 300, the flow starts, and the electronic device 110 is powered on and the connection with the electronic device 120 of the second conference room is completed. In step 302, the voice activity detection circuit 220 receives the sound signals from the microphones 204_1-204_N, and determines whether there is a voice component in these sound signals, if yes, the flow enters Step 304; if not, the flow stays in Step 302 to continue detecting if the received sound signals have voice components. In Step 304, after the processing circuit 240 knows that the voice activity detection circuit 220 detects that the sound signals have voice components, the processing circuit 240 enables the person recognition circuit 210, so that the person recognition circuit 210 starts to perform person recognition on the received image data to determine whether there is a person in the received image data, and to determine the characteristic value of each person and the position/region of each person in the image. Taking FIG. 4 as an example, the person recognition circuit 210 detects that there are three people in the image, so it can determine the regions 410-430 of each person in the frame, and determine the characteristic values of the contents in the regions 410-430 as the characteristic values of three people, respectively. In Step 306, the processing circuit 240 enables the sound direction detection circuit 230, and the sound direction detection circuit 230 starts to determine the direction and angle of the main sound relative to the electronic device 110 according to the time difference of the sound signals from the microphones 204_1-204_N. It is noted that Step 304 and Step 306 can be executed simultaneously, that is, the execution time of this embodiment is not limited to the sequence shown in FIG. 3.

In Step 308, the processing circuit 240 determines which person in the image (image frame) is speaking by using the regions where each person is located in the frame determined by the person recognition circuit 210 (for example, the regions 410-430 in FIG. 4) and the direction and angle of the main speaker relative to the electronic device 110 detected by the sound direction detection circuit 230. In Step 310, after determining the person who is speaking in the image, the processing circuit 240 processes the image data obtained from the image capturing device 202 to highlight the main speaker in the image data. Specifically, referring to FIG. 5, if the processing circuit 240 determines that the person in the region 420 is the main speaker, the processing circuit 240 can take the region 420 of the frame 400 as a ROI, extract the image data in the region 420, and perform an enhancement operation on the image data in the region 420 to generate an enhanced region 420'. In one embodiment, the processing circuit 240 may enlarge the region 420 and perform image processing, such as pixel value interpolation or edge enhancement, to generate the enhanced region 420'. In another embodiment, the processing circuit 240 may use an artificial intelligence (AI) super resolution algorithm to process the region 420 to obtain the enhanced region 420' with better resolution. It is noted that since the operation of image enlargement and AI super-resolution algorithm is well known to those skilled in the art, the details are not repeated here.

Figure 5:
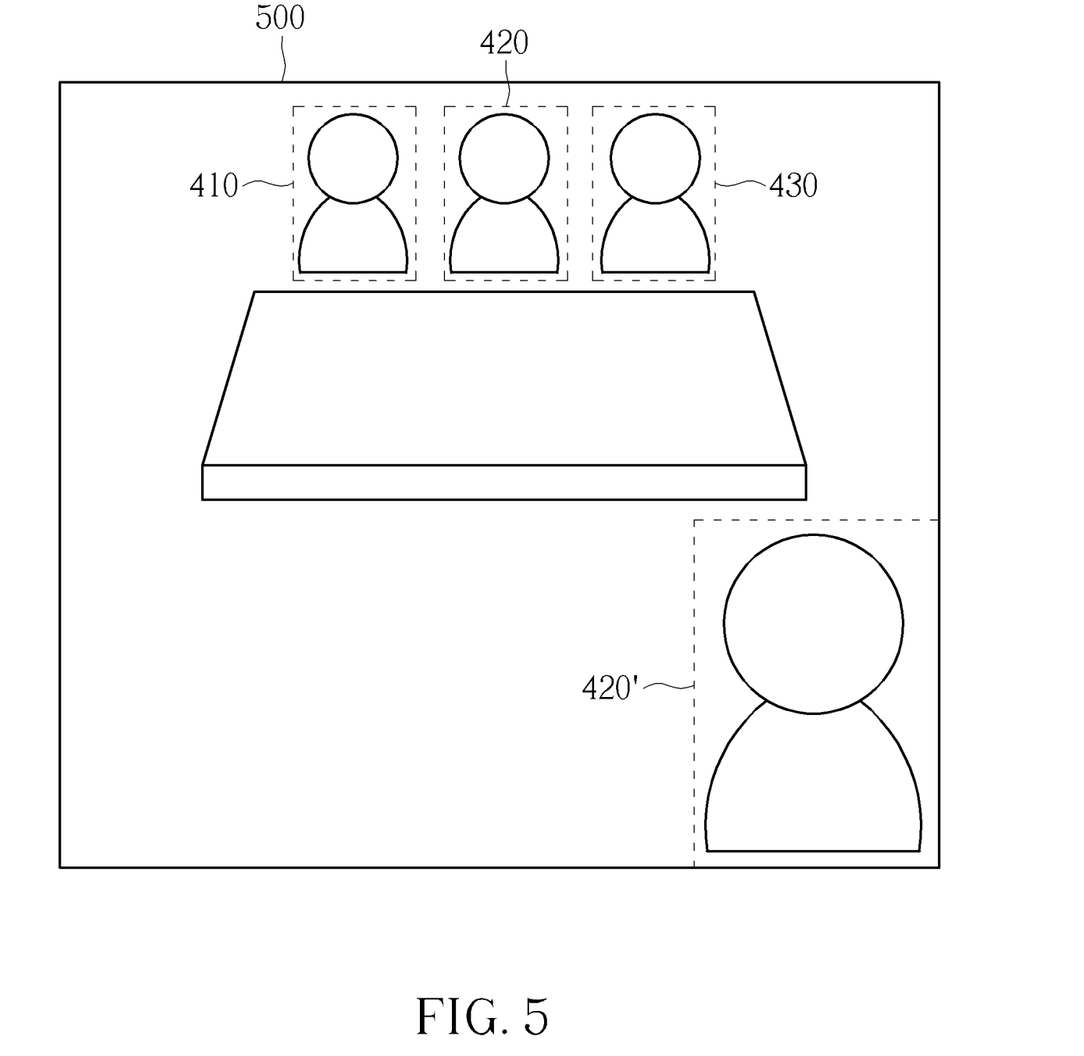
FIG. 5 is a diagram showing an enhanced region of a processed frame according to one embodiment of the present invention.

In step 312, the processing circuit 240 combines the enhanced region 420' with the frame 400, for example, the enhanced region 420' directly covers an area of the frame 400 to generate a processed frame 500. In one embodiment, the processing circuit 240 may directly cover the enhanced region 420' to a specific position of the frame 400, such as the lower left corner or the lower right corner, to generate the processed frame 500. In another embodiment, the processing circuit 240 may detect an area in the frame 400 where no person appears, and directly cover the enhanced area 420' to the area in the frame 400 to generate the processed frame 500, so as to prevent the enhanced area 420' from covering the person(s) in the regions 410-430.

In step 314, the processing circuit 240 transmits the processed image data (i.e., the processed frame 500) to a back-end circuit for other image processing, and then the processed image data is transmitted to the electronic device 120 located in the second conference room through the network, so that the participants in the second conference room can clearly know who is currently speaking in the first conference room. In this embodiment, the electronic device 120 located in the second conference room only receives the processed image data (i.e., the processed frame 500), but does not receive the original image data (i.e., the frame 400).

In one embodiment, the processing circuit 240 continues to track the previously enhanced region, and continues to process the image data from the image capturing device 202 to generate the processed image data. Specifically, the person recognition circuit 210 can continuously determine the region where each person is located in the frame and its characteristic value, and the processing circuit 240 can continue to highlight this person in the following frames according to the characteristic value of the previously highlighted person. Taking the region 420 in FIG. 5 as an example, the processing circuit 240 can track the region/person whose characteristic value is similar to those of the region 420 in the following received frames (for example, the characteristic value difference is within a range), so as to continuously enhance the region in the subsequent frames, even if the person in the enhanced region does not speak for a short period of time in the subsequent frames, and the sound direction detection circuit 230 does not detect any sound in the direction of the person. In one embodiment, the processing circuit 240 determines if the person who is speaking is changed according to the region of each person in the frame determined by the person recognition circuit 210, the direction and angle of the main speaker relative to the electronic device 110 detected by the sound direction detection circuit 230, and whether someone is speaking detected by the voice activity detection circuit 220 (that is, the received sound signal has a voice component), to determine whether to switch the ROI to another region.

As shown in the flowchart of FIG. 3, after obtaining the image data, the SoC 200 of the electronic device 110 will first enhance the ROI to generate the processed image data, and then transmit the processed image data through the network to the electronic device 120 located in the second conference room, therefore, the participants in the second conference room can directly see the ROI with better image quality, so as to improve the conference quality. In addition, since the SoC 200 of the electronic device 110 only performs image enhancement for the ROI, and does not perform image enhancement for all the contents of the frame 400, the video processing method of this embodiment will not cause too much burden to the SoC 200, and will not cause too much delay to real-time image transmission.

Figure 6:
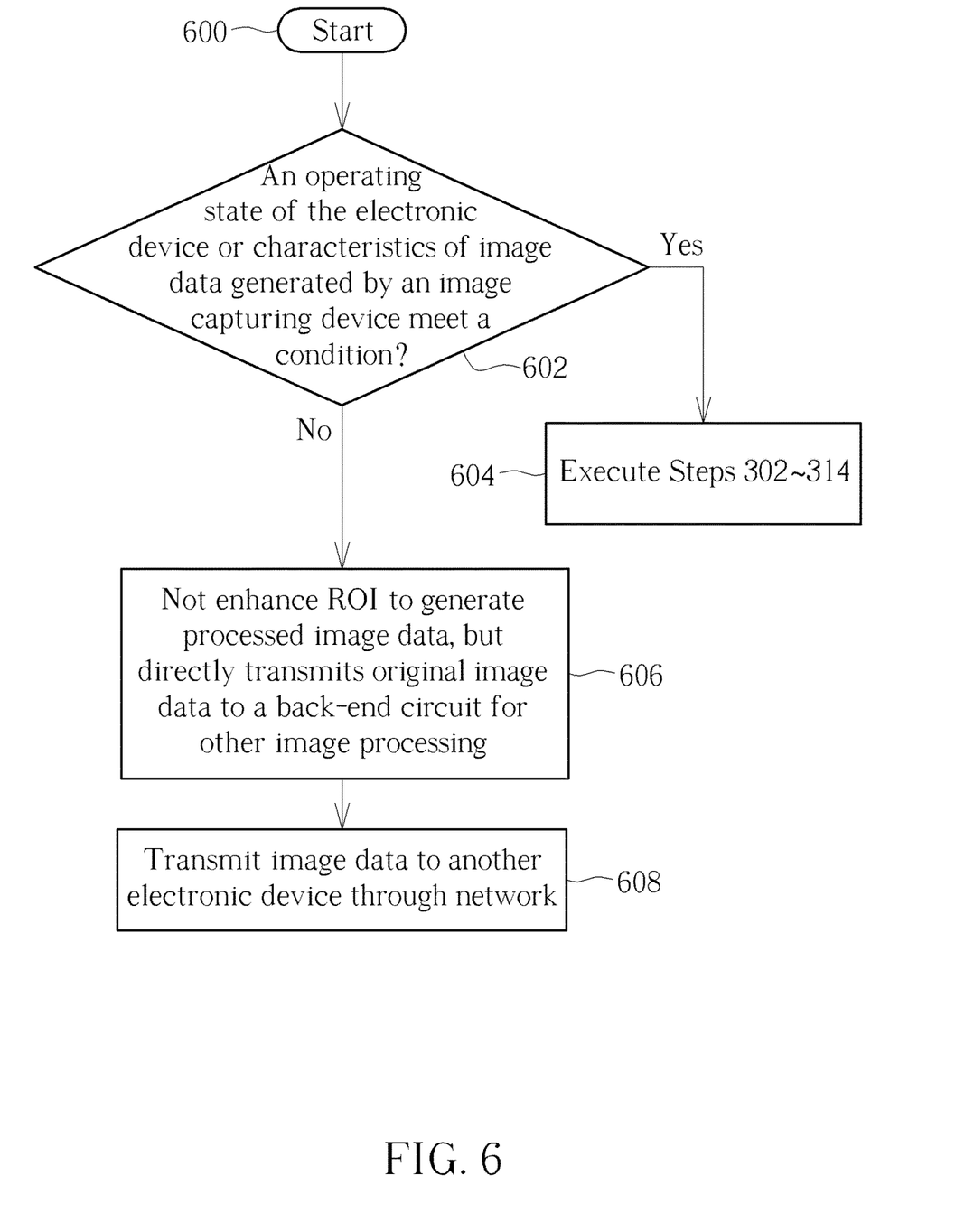
FIG. 6 is a flowchart of a video processing method according to one embodiment of the present invention.

In one embodiment, the SoC 200 may determine whether to use the video processing method shown in FIG. 3 according to some operating states of the electronic device 110 or characteristics of the image data generated by the image capture device 202. Specifically, refer to FIG. 6 showing a flowchart of a video processing method according to another embodiment of the present invention. In Step 600, the flow starts, and the electronic device 110 is powered on and the connection with the electronic device 120 of the second conference room is completed. In Step 602, the processing circuit 240 in the SoC chip 200 determines whether the operating state of the electronic device 110 or the characteristics of the image data generated by the image capturing device 202 meet a condition, if yes, the flow enters Step 604; and if not, the flow enters Step 606. In one embodiment, the operating state of the electronic device 110 may be a network speed of the electronic device 110 or maximum allowable throughput, and the characteristic of the image data generated by the image capturing device 202 may be a resolution. In one embodiment, when the network speed or the allowable maximum throughput of the electronic device 110 is lower than a threshold or is in a lower range, the processing circuit 240 determines that the condition is met and the flow enters Step 604; and/or when the resolution of the image data generated by the image capturing device 202 is lower than a threshold or is in a lower range, the processing circuit 240 determines that the condition is met and the flow enters Step 604; and/or when the network speed or the allowable maximum throughput of the electronic device 110 is higher than a threshold or is in a higher range, the processing circuit 240 determines that the condition is not met and the flow enters Step 606; and/or when the resolution of the image data generated by the image capturing device 202 is higher than a threshold or is in a higher range, the processing circuit 240 determines that the condition is not met and the flow enters Step 606.

In Step 604, because the network speed is slow or the resolution of the image data is low, the SoC chip 200 executes Steps 302-314 shown in FIG. 3 to enhance the ROI after obtaining the image data to generate the processed image data, and then transmit the processed image data to the electronic devices 120 located in the second conference room.

In Steps 606 and 608, because the network speed is high and/or the resolution of the image data is high, the SoC 200 does not perform Steps 302-314 shown in FIG. 3, that is, the SoC 200 does not enhance the ROI to generate the processed image data, but directly transmits the original image data to the back-end circuit for other image processing, and then transmits it to the electronic device 120 in the second conference room through the network. At this time, the participants in the second conference room see a frame 400 similar to that shown in FIG. 4 without the enhanced region.

In the embodiment shown in FIG. 6, because the participants in the second conference room are more likely to view images with poor quality when the network speed is slow or the resolution of the image data is low, the SoC chip 200 will execute Steps 302-314 shown in FIG. 3 only when the above condition(s) is/are met. Because the participants in the second conference room can already see the images with better quality when the network speed is high or the resolution of the image data is high, the SoC 200 may not need to execute the Steps 302-314 shown in FIG. 3, to reduce system burden and save power consumption.

It should be noted that, in the embodiments shown in FIG. 1 to FIG. 6, the remote conference is used for description, but the present invention is not limited to this. In other embodiments, the electronic device 110 can be installed in any place that needs to transmit the captured image data to a remote site in real time. For example, the electronic device 110 can be a monitoring device installed at an intersection or around a house. In addition, the person recognition circuit in the SoC 200 can be replaced with any other recognition circuit to identify a specific object as a ROI. For example, when the electronic device 110 is a monitoring device installed at an intersection, the recognition circuit included in the SoC 200 can be used to identify the license plate in the image data, and enhance the region having the license plate. At this time, the voice activity detection circuit 220 and the sound direction detection circuit 230 can be removed from the SoC 200. These alternative designs should belong to the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system on chip (SoC), comprising:
 a recognition circuit, configured to obtain image data from an image capturing device, and perform a recognition operation on the image data to generate a recognition result; and
 a processing circuit, coupled to the recognition circuit, configured to determine a region of interest (ROI) in the image data according to the recognition result, perform image enhancement operation on the ROI to generate an enhanced region, and combine the enhanced region with the image data to generate processed image data;
 wherein the recognition circuit is a person recognition circuit, the person recognition circuit performs a person recognition operation on the image data to generate the recognition result, and the SoC further comprises:
 a sound detection circuit, configured to receive a plurality of sound signals from a plurality of microphones, and detect a position/direction of a main sound to generate a sound detection result;
 wherein the processing circuit determines a region where a speaker is located in the image data according to the recognition result and the sound detection result, as the ROI.

2. The SoC of claim 1, wherein the processing circuit covers the enhanced region to a specific area of the image data to generate the processed image data.

3. The SoC of claim 2, wherein the specific area does not overlap the ROI.

4. The SoC of claim 2, wherein the processing circuit performs an enlargement operation and a resolution enhancement operation on the ROI to generate the enhanced region.

5. The SoC of claim 1, wherein the recognition result comprises a plurality of regions, each region comprises a person, and the processing circuit refers to the recognition result and the sound detection result to select one of the regions to serve as the ROI.

6. The SoC of claim 1, wherein the SoC is used in an electronic device, and the processed image data is transmitted from the electronic device to another electronic device via network.

7. A video processing method, comprising:
 obtaining image data from an image capturing device, and performing a recognition operation on the image data to generate a recognition result;
 determining a region of interest (ROI) in the image data according to the recognition result;
 performing image enhancement operation on the ROI to generate an enhanced region; and
 combining the enhanced region with the image data to generate processed image data;
 wherein the step of performing the recognition operation on the image data to generate the recognition result is to perform a person recognition operation on the image data to generate the recognition result, and the video processing method further comprises:
 receiving a plurality of sound signals from a plurality of microphones, and detecting a position/direction of a main sound to generate a sound detection result; and
 the step of determining the RIO in the image data according to the recognition result comprises:
 determines a region where a speaker is located in the image data according to the recognition result and the sound detection result, as the ROI.

8. The video processing method of claim 7, wherein the step of combining the enhanced region with the image data to generate the processed image data comprises:
 covering the enhanced region to a specific region of the image data to generate the processed image data.

* * * * *